United States Patent
Kim et al.

(10) Patent No.: US 7,366,588 B2
(45) Date of Patent: Apr. 29, 2008

(54) SYSTEM AND METHOD FOR MANAGING INDOOR AIR THROUGH COOPERATION BETWEEN AIR CONDITIONER AND MOBILE ASSISTANT DEVICE

(75) Inventors: Jay-woo Kim, Yongin-si (KR); Dong-kwan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/220,575

(22) Filed: Sep. 8, 2005

(65) Prior Publication Data

US 2006/0064204 A1   Mar. 23, 2006

(30) Foreign Application Priority Data

Sep. 23, 2004 (KR) .................. 10-2004-0076519

(51) Int. Cl.
*G01M 1/38* (2006.01)
(52) U.S. Cl. .................. 700/276; 700/277; 165/247; 62/180
(58) Field of Classification Search ........ 700/276–278, 700/299–300; 165/247; 62/180
See application file for complete search history.

(56) References Cited

U.S. PATENT DOCUMENTS

| | | | |
|---|---|---|---|
| 2,791,401 A * | 5/1957 | Harslem et al. ............... 165/42 |
| 5,775,989 A | 7/1998 | Choi | |
| 6,747,872 B1 * | 6/2004 | Patel et al. ................. 361/695 |
| 6,834,512 B2 * | 12/2004 | Bash et al. .................... 62/180 |
| 7,051,946 B2 * | 5/2006 | Bash et al. ................ 236/49.3 |
| 2003/0221821 A1 * | 12/2003 | Patel et al. .................. 165/247 |
| 2004/0256474 A1 * | 12/2004 | Park et al. ..................... 236/51 |

FOREIGN PATENT DOCUMENTS

| | | |
|---|---|---|
| EP | 1 640 672 A2 | 3/2006 |
| EP | 1 640 672 A3 | 6/2006 |
| GB | 2 404 331 | 2/2005 |
| JP | 05343496 | 12/1993 |

OTHER PUBLICATIONS

Yamamoto et al, Motion Analysis of a Cleaner Robot for Vertical Type Air Conditioning Duct, IEEE 2004, pp. 4442-4446.*
European Search Report for Application No. 05255655.2; dated Nov. 28, 2006.

* cited by examiner

*Primary Examiner*—Zoila Cabrera
(74) *Attorney, Agent, or Firm*—Staas & Halsey LLP

(57) ABSTRACT

A method and system for efficiently managing indoor air through cooperation between a mobile device and a stationary air conditioner. The system may include at least one stationary air conditioner and at least one mobile assistant device that move with a predetermined management area and cooperates with the air conditioner. The air conditioner may include an air quality improving unit improving a value of a predetermined air quality index into an appropriate range, a first forced flow unit generating a main flow to transport improved air toward the abnormal region, and a control unit controlling the air quality improving unit and the first forced flow unit to perform a main operation on the abnormal region and transmitting a command instructing the assistant device to perform an assistant operation on the abnormal region to the assistant device.

17 Claims, 11 Drawing Sheets

SYSTEM AND METHOD FOR MANAGING INDOOR AIR THROUGH COOPERATION BETWEEN AIR CONDITIONER AND MOBILE ASSISTANT DEVICE

CROSS-REFERENCE TO RELATED APPLICATION

This application claims the benefit of Korean Patent Application No. 10-2004-0076519, filed on Sep. 23, 2004 in the Korean Intellectual Property Office, the disclosure of which is incorporated herein by reference.

BACKGROUND OF THE INVENTION

1. Field of the Invention

The present invention relates generally to an air-conditioning system. More particularly, embodiments of the present invention relate to a method and system for efficiently managing indoor air through cooperation between a mobile device and a stationary air conditioner.

2. Description of the Related Art

Air conditioning refers to maintaining optimal indoor air conditions to increase residents' comfort, prevent external contamination, and increase working performance. Air conditioning typically involves four factors: temperature (heating and cooling), humidity (humidification and dehumidification), ventilation, and cleanness (percolation and filtering). Users want indoor air to be clean and pleasant, that is, the users want the four factors to be appropriately adjusted and maintained.

However, it is difficult to keep an entire indoor region (e.g., a house) of air clean and pleasant with only one air conditioning apparatus (e.g., an air conditioner or an air cleaner) due to many reasons. One of the reasons is that air flow is restricted by the capacity limit of a single air conditioning apparatus. Another is that it is difficult to detect the state of the entire indoor region of air unless sensors are installed throughout the house.

To overcome the restriction of the air flow, Samsung Electronics launched a "network air-conditioner" which includes an assistant device having a fan and a motor to generate air flow, and a main device (i.e., a main air conditioner or a main air cleaner) cooperating with the assistant device. The assistant device generates air flow at a place where flow energy generated by the main device is weak. In addition, the assistant device includes a temperature sensor, a dust sensor, an odor sensor, a gas sensor, or an air-volume sensor to monitor an air state at an installation position and report the air state to the main device so that the main device controls an air volume, a wind direction, or a cleaning function when necessary.

However, the air state can be monitored or detected only at a place where the assistant device is installed and it is impossible to detect the entire air state of the house. Moreover, even if a user finds a place where air conditioning is needed, it is inconvenient to manually move the assistant device to that particular place.

SUMMARY OF THE INVENTION

Embodiments of the present invention provide a method and system to maintain an appropriate air-conditioning state throughout a predetermined area using a stationary air conditioner and a mobile assistant device.

Embodiments of the present invention also provide a method and system to quickly control an air-conditioning state in a region, which needs the improvement of the air condition, through efficient cooperation between a stationary device and a mobile assistant device and further provide a method and system to accurately detect a current position of the mobile assistant device.

Embodiments of the present invention also provide a method and system to create an air quality map indicating a current air-conditioning state of a predetermined area.

According to an aspect of the present invention, there is provided an air conditioning system including at least one stationary air conditioner and at least one mobile assistant device that moves within a predetermined management area and cooperates with the air conditioner. The air conditioner includes an air quality improving unit improving a value of a predetermined air quality index into an appropriate range, a first forced flow unit generating a main flow to transport improved air toward the abnormal region, and a control unit controlling the air quality improving unit and the first forced flow unit to perform a main operation on the abnormal region and transmitting a command instructing the mobile assistant device to perform an assistant operation on the abnormal region. The mobile assistant device includes a traveling unit moving the mobile assistant device to the abnormal region in response to the command, and a second forced flow unit generating an assistant flow to transport the improved air transported by the main flow into the abnormal region.

According to another aspect of the present invention, there is provided a method of improving air quality of a predetermined abnormal region in a management area through cooperation between at least one stationary air conditioner and at least one mobile assistant device, the method including transmitting an assistant operation command to the mobile assistant device using the air conditioner, moving the mobile assistant device to the abnormal region in response to the assistant operation command, improving a value of a predetermined air quality index into an appropriate range and generating a main flow using the air conditioner to transport improved air toward the abnormal region, and generating an assistant flow using the mobile assistant device to transport the improved air, which has been transported by the main flow, into the abnormal region.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
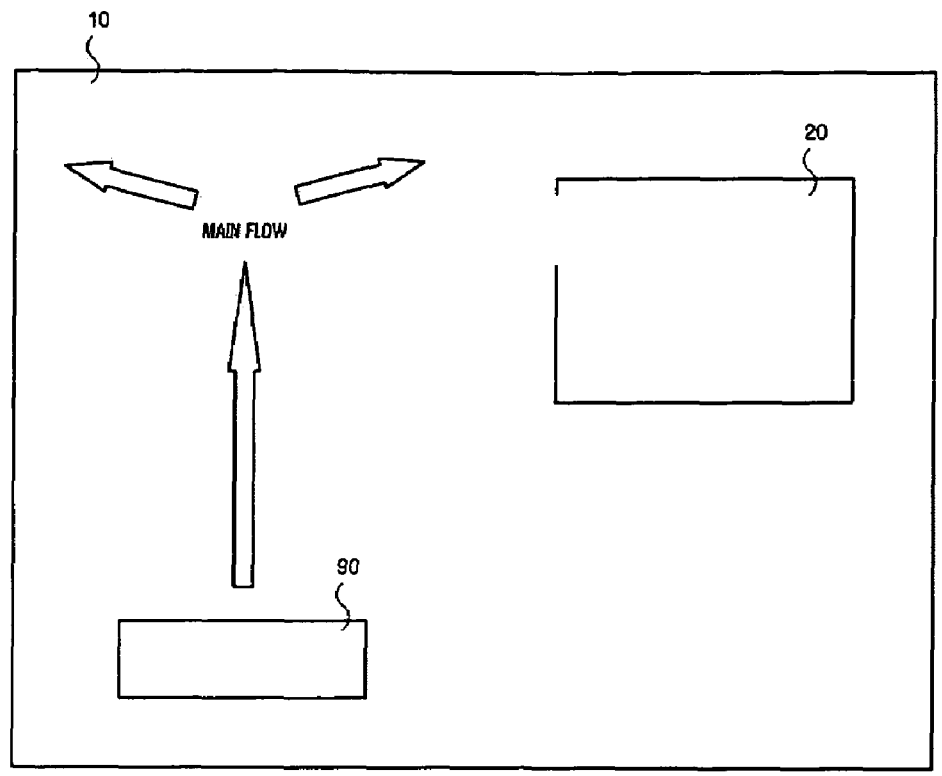
FIG. 1 is a schematic representation of a conventional arrangement where only a main device exists within a management area.

Reference will now be made in detail to the embodiments of the present invention, examples of which are illustrated in the accompanying drawings, wherein like reference numerals refer to the like elements throughout. The embodiments are described below to explain the present invention by referring to the figures.

An air-conditioning system according to embodiments of the present invention includes at least one main device and at least one assistant device. The main device can communicate with the assistant device to create an air quality map, determine the priority order of regions in which an operation for improving air quality will be performed based on the air quality map, perform a "main operation" on a target region having a high priority order (hereinafter, referred to as a priority region), and give the assistant device a command to move near the target region and perform an "assistant operation" (hereinafter, referred to as an assistant operation command). The main device includes a unit for improving air quality (referred to as an air quality improving unit) and a fan-tilt unit ventilating the improved air. Examples of the air quality improving unit are an air cooler, an air heater, a humidifier, a dehumidifier, an ion generator, a dust remover, and/or a filter. The fan-tilt unit may include a fan forcibly blowing the improved air and a plurality of tilt bars adjusting the direction of air flow. The tilt bars may include a horizontal tilt bar changing air flow in a horizontal direction and a vertical tilt bar changing the air flow in a vertical direction.

The assistant device can measure air quality at a certain position in an entire area which is a target of air quality management (hereafter, referred to as a "management area") and transmit the measured air quality to the main device. When the assistant operation command is received from the main device, the assistant device can move to a position where an air quality managing work will be performed (hereinafter, referred to as a "work position" and perform an assistant operation on a priority region. To move from a current position to the work position, the assistant device may need to calculate displacement using the absolute coordinates of the current position and the work position and move according to the calculated displacement.

A main operation performed by the main device is to improve the air quality of the target region, and may include a quality improving operation by the air quality improving unit and a main flow operation by the fan-tilt unit. The assistant operation may be performed by the assistant device to improve the air quality of the target region, and may include an assistant flow operation leading the air flow generated by the main flow operation to the target region.

Referring to FIG. 1, if only a main device 90 exists in a management area 10, like in conventional technology, air whose quality has been improved by the main device 90 can be dispersed around in the management area 10 due to forced air flow. However, in a normal room having obstacles, a region 20 in which air quality is not properly managed only by the main device 90 may exist and it is difficult to improve air quality in this region 20 even after reasonable time elapses. If the operating performance of the main device 90 is increased to improve the air quality of the region 20, energy consumption increases and, on the contrary, a pleasant air state near the main device 90 is lost due to excessive operation of the main device 90.

Figure 2:
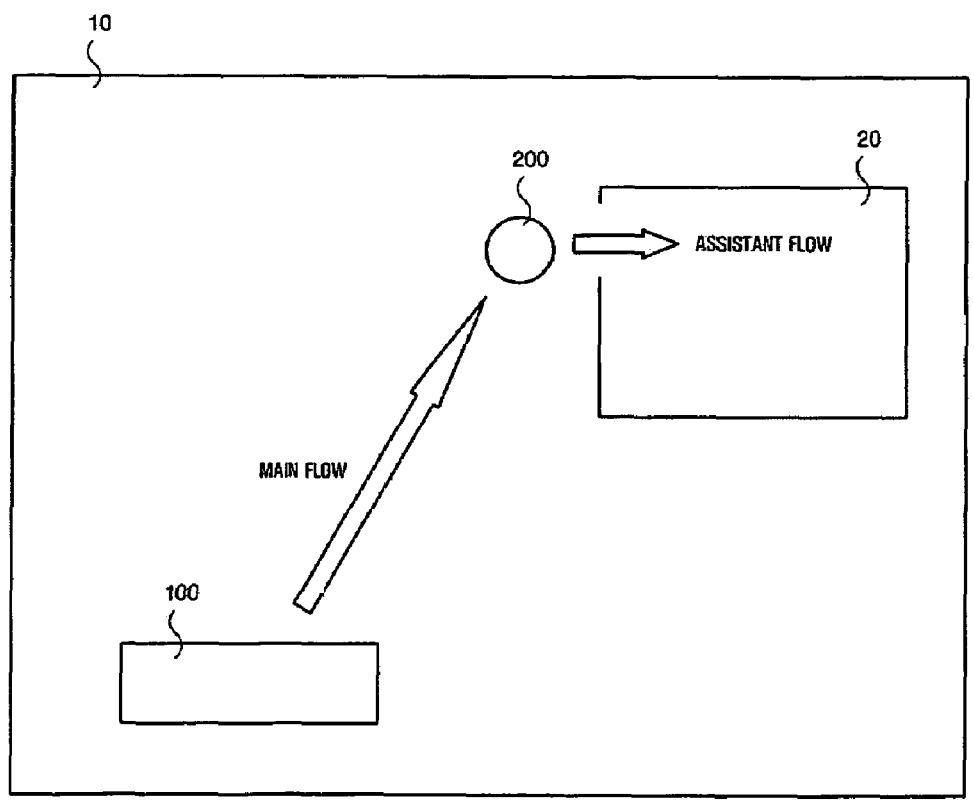
FIG. 2 is a schematic representation of an arrangement where a main device cooperates with an assistant device within a management area, according to an embodiment of the present invention.

However, if an assistant device 200, which can be moved, is used together with the main device 100, as shown in FIG. 2, the air quality of the region 20 that is not managed by the main device 100 can be improved. Here, the main device 100 generates main flow toward the assistant device 200 and the assistant device 200 generates assistant flow in the region 20. The assistant device 200 may have only a function that generates the assistant flow but may include a separate air quality improving unit such as an air purifying filter, an anion generator, or an electric dust absorber therewithin, for example.

Figure 3:
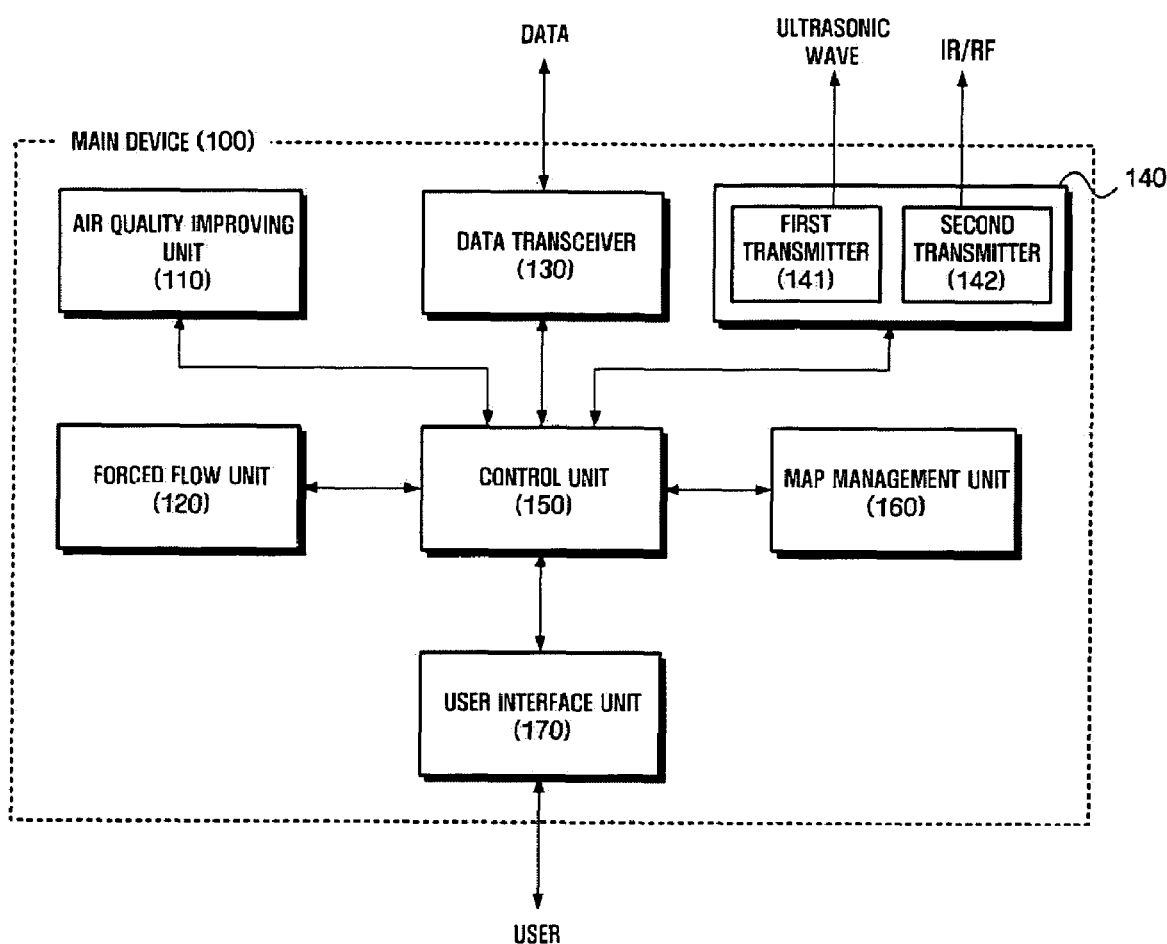
FIG. 3 is a block diagram of a main device, according to an embodiment of the present invention.

FIG. 3 is a block diagram of the main device 100, according to an embodiment of the present invention. The main device 100 may include an air quality improving unit 110, a forced flow unit 120, a data transceiver 130, a reference signal transmitting unit 140, a control unit 150, a map management unit 160, and a user interface unit 170.

The air quality improving unit 110 may improve the quality of air such that an index, such as temperature, odor, humidity, the amount of dust, or a volatile organic compound (VOC) indicating air quality is brought into a range desirable or appropriate to a user, for example. Hereinafter, an index indicating the air quality is referred to as an "air quality index" and a value expressed in unit of the air quality index (e.g., Celsius when the air quality index is temperature) will be referred to as an air quality index value.

The air quality improving unit 110 may operate as an air heater when temperature needs to be increased and as an air cooler when the temperature needs to be decreased. In addition, the air quality improving unit 110 may operate as a humidifier when humidity needs to be increased and as a dehumidifier when the humidity needs to be decreased, for example. Normally, people start feeling cold at a temperature of 5° C. and start feeling hot at a temperature of 28° C. An optimal temperature range of people's domicile is known as 18-22° C. and appropriate humidity for people is about 50-60%.

Additionally, the air quality improving unit 110 may operate to remove odors, dust, or volatile organic compounds (VOCs). The air quality improving unit 110 may be implemented using conventional technology. Thus, a detailed description of the structure and operation thereof will be further omitted.

The forced flow unit 120 generates forced air flow toward a particular region in a management area to transport the improved air to the particular region. Usually, a fan rotator is used to generate forced air flow and the direction of the forced flow can be controlled using tilt bars that may include a horizontal tilt bar controlling the horizontal direction of the air flow and a vertical tilt bar controlling the vertical direction of the air flow, for example.

The data transceiver 130 may transmit and receive data to and from the assistant device 200 using wireless communication such as, e.g., a wireless local area network (WLAN) method complying with the Institute of Electrical and Electronics Engineers (IEEE) 802.11 family of standards, a wireless personal area network (WPAN) method complying with an IEEE 802.15.3 standard, a Bluetooth method, or an InfraRed (IR) method, etc.

The data transceiver 130 receives an air quality map element including coordinate information of a particular position and air quality information of the particular position from the assistant device 200. For example, the air quality map element may be expressed as $(x, y, Q_1, Q_2, \ldots, Q_n)$ where "x" is an x-coordinate of a particular position where the air quality is measured, "y" is a y-coordinate of the particular position, and $Q_1$ through $Q_n$ are values of air quality indexes, respectively, used by the main device 100 and the assistant device 200. Here, "n" is an integer index equal to or greater than 1.

In addition, the data transceiver 130 may receive an assistant operation command from the control unit 150 and transmit it to the assistant device 200.

The reference signal transmitting unit 140 may transmit a predetermined signal (hereinafter, referred to as a reference signal) that is referred to for detection of the position of the assistant device 200. The reference signal transmitting unit 140 can include a first transmitter 141 and a second transmitter 142. The first transmitter 141 may transmit a sound wave, e.g., an ultrasonic wave, to detect the position of an assistant device 200. The second transmitter 142 may transmit a time synchronizing signal when the ultrasonic wave is transmitted. The time synchronizing signal can be used to measure the positional relationship between the main device 100 and the assistant device 200 using a time difference between transmission of an ultrasonic wave and reception of the ultrasonic wave. The time synchronizing signal has a much greater propagation speed than ultrasonic waves and may be, for example, an IR signal or a radio frequency (RF) signal. When the second transmitter 142 uses IR rays, it may include an IR source that can emit IR rays forward with a predetermined angle (e.g., at 160°) at one time.

The reference signal transmitting unit 140 transmits a signal referred to by the assistant device 200 to detect the position thereof or compensate for the position. However, if the assistant device 200 can detect, by itself, the position thereof on an absolute coordinate system, the reference signal transmitting unit 140 may be omitted, for example. Although one method of detecting the position of the assistant device 200 by referring to the main device 100 has been described above, many other methods may be easily used to detect the position of the assistant device 200 by referring to the main device 100. Alternatively, the assistant device 200 may independently detect an absolute position thereof and an absolute position of the main device 100 and measure a distance therebetween and a directional position based on these absolute positions.

The map management unit 160 updates the air quality map of the entire management area using the air quality map element received from the data transceiver 130 and determines a priority order of target regions, in which an operation for improving the air quality will be performed, based on the updated air quality map.

The user interface unit 170 may receive a command from a user and display current air quality information to the user. The user's command may be received through a button, a remote control unit, a touch screen, or the like, and may be a command to set automatic or manual operations of the main device 100 and the assistant device 200 or a command to set the priority order of the target regions. The display to the user may be implemented using a display device such as a liquid crystal display (LCD) or a light emitting diode (LED). Current values and target values of air quality indexes such as temperature, humidity, the amount of dust (cleanness), and contamination may also be displayed by the display device.

The control unit 150 may control the operations of other elements included in the main device 100. The control unit 150 may receive position information of a region having high priority, i.e., a priority region and information (e.g., a type and a target value) regarding an air quality index to be improved from the map management unit 160, perform a main operation according to the received information, and transmit an assistant operation command for the priority region to the assistant device 200 through the data transceiver 130. The assistant operation command may include a position of the priority region, a work position to which the assistant device 200 may need to move to perform an assistant operation on the priority region, and a type and target value of an air quality index to be improved in the priority region. When performing a main operation, the control unit 150 may control the air quality improving unit 110 and the forced flow unit 120 to improve the air quality and generate a forced flow (a main flow) of the improved air toward the priority region.

Figure 4:
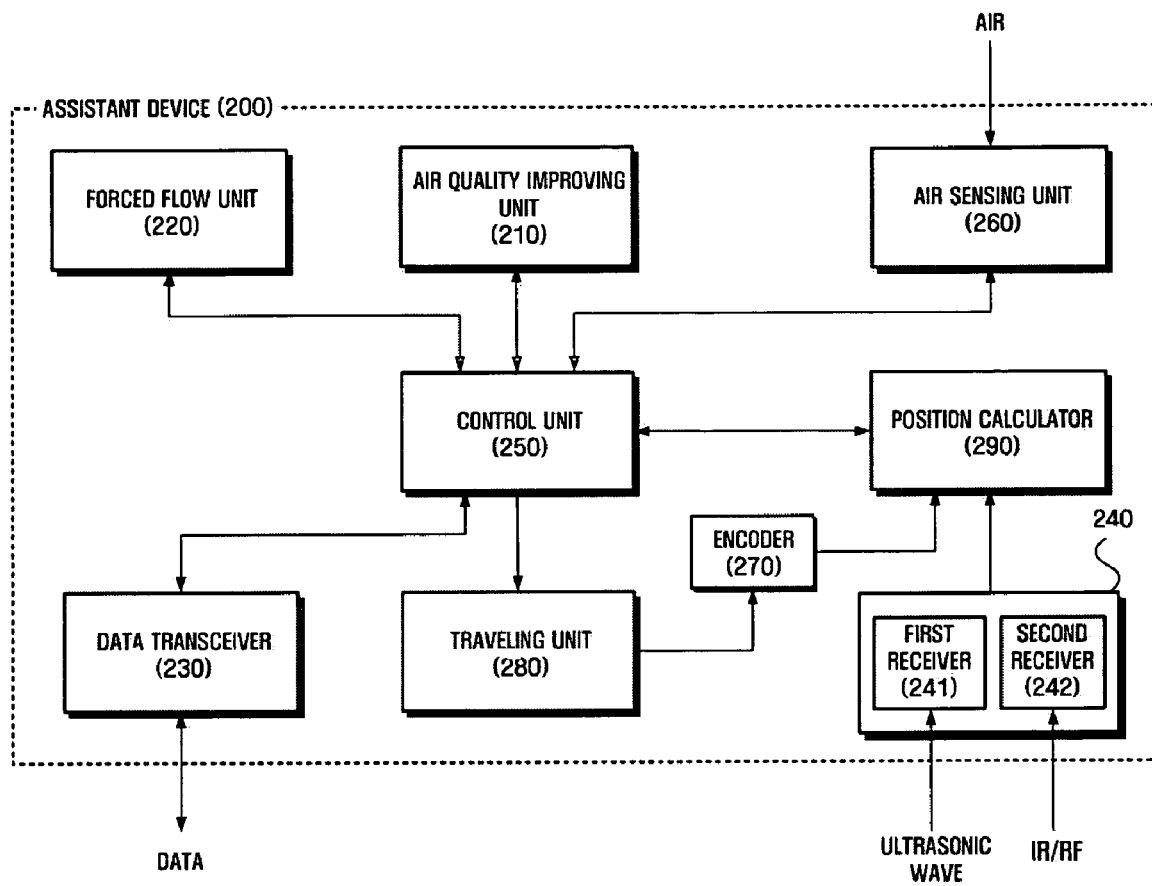
FIG. 4 is a block diagram of an assistant device, according to an embodiment of the present invention.

FIG. 4 is a block diagram of the assistant device 200 according to an embodiment of the present invention. The assistant device 200 may include an air quality improving unit 210, a forced flow unit 220, a data transceiver 230, a reference signal receiving unit 240, a control unit 250, an air sensing unit 260, an encoder 270, a traveling unit 280, and a position calculator 290, for example.

Like the air quality improving unit 110 included in the main device 100, the air quality improving unit 210 also may improve air quality such that an air quality index value is brought into a range desirable or appropriate to a user. The air quality improving unit 210 included in the assistant device 200 may operate independently of the air quality improving unit 110 included in the main device 100 to improve air quality around the assistant device 200. The air quality improving unit 210 is not necessarily included in the assistant device 200 in which case only the air quality improving unit 110 included in the main device 100 may be used to improve the air quality.

The forced flow unit 220 generates a forced flow (i.e., an assistant flow) of the air, which has been transported from the main device 100 by the main flow, to the priority region. A fan rotator may be used to generate the assistant flow and a tilt bar may be further provided to control a direction of the assistant flow.

Like the data transceiver 130 included in the main device 100, the data transceiver 230 may be implemented using the WLAN method complying with the IEEE 802.11 family of standards, the WPAN method complying with the IEEE 802.15.3 standard, the Bluetooth method, the IR method, or the like, for example.

The reference signal receiving unit 240 may include a first receiver 241 and a second receiver 242 respectively corresponding to the first and second transmitters 141 and 142 of the reference signal transmitting unit 140 included in the main device 100. The first receiver 241 may include a predetermined number of ultrasonic sensors which receive an ultrasonic wave transmitted from the main device 100. In an embodiment, the first receiver 241 includes at least two ultrasonic sensors. The ultrasonic sensors may be equiangularly disposed on an outer circumference of the assistant device 200. The second receiver 242 may receive the time synchronizing signal transmitted from the main device 100. When the second transmitter 142 transmits an IR signal, the second receiver 242 may include a filter that selectively passes only IR rays to reduce interference of light of other frequencies.

The air sensing unit 260 may sense an air state and convert the air state into an electrical signal. Here, for example, the strength of the electrical signal increases or decreases when a value of an air quality index (e.g., temperature or humidity) increases, and therefore, an air quality index value can be obtained by measuring the strength of an electrical signal of the air quality index.

Figure 5:
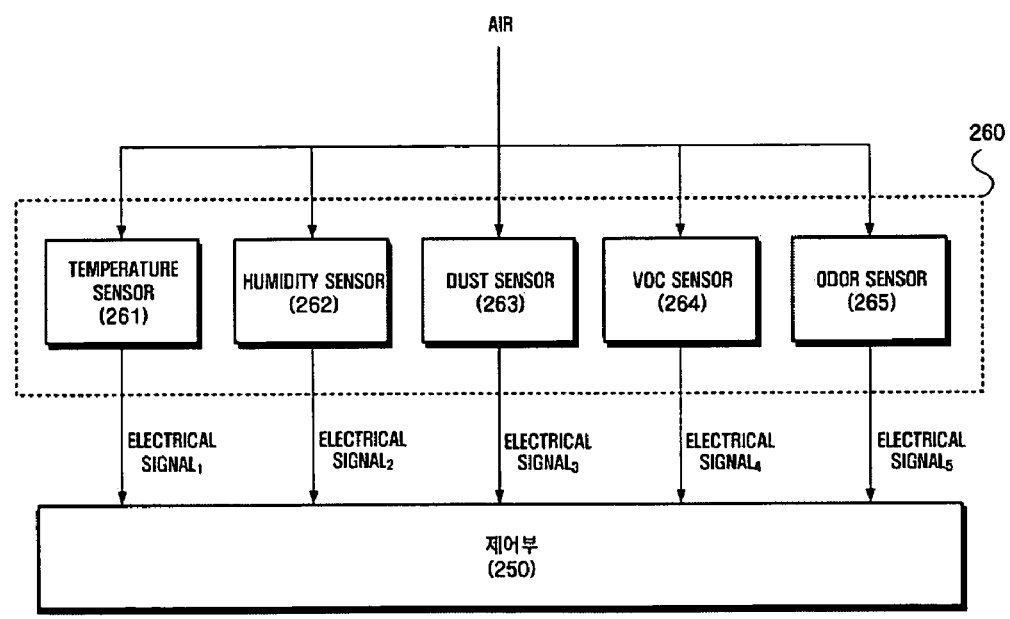
FIG. 5 is a block diagram of an air sensing unit including different types of air sensors.

Referring to FIG. 5, the air sensing unit 260 may include at least one sensor among a temperature sensor 261, a humidity sensor 262, a dust sensor 263, a VOC sensor 264, and an odor sensor 265, for example. Since many conventional methods for implementing the temperature sensor 261 and the humidity sensor 262 are known, the description thereof will be further omitted. The dust sensor 263, the VOC sensor 264, and the odor sensor 265 may also be implemented using conventional methods.

As only examples, the dust sensor 263 may be implemented according to U.S. Pat. No. 5,163,202 entitled "Dust Detector for Vacuum Cleaner" or U.S. Pat. No. 5,319,827 entitled "Device of Sensing Dust for a Vacuum Cleaner". The VOC sensor 264 may be implemented according to U.S. Pat. No. 5,445,795 entitled "Volatile Organic Compound Sensing Devices" or U.S. Pat. No. 6,716,406 entitled "Control System for a Photocatalytic Air Purifier". The odor sensor 265 may be implemented according to U.S. Pat. No. 5,047,214 entitled "Smell Sensing Element and Smell Sensing Device" or U.S. Pat. No. 5,352,867 entitled "Heat Cooking Apparatus with Odor sensor".

The encoder 270 may measure a position change (i.e., displacement) and a direction change between a previous position and a current position of the assistant device 200. The encoder 270 can calculate the displacement and the direction change using the rotation speed of a wheel of the traveling unit 280 and the traveling angle of the assistant device 200 (i.e., the rotation angle of a steering column 307 shown in FIG. 7). However, since the encoder 270 may sense the motion of the wheel, it may not correctly calculate in an abnormal situation such as when the wheel slips or the assistant device 200 overturns.

When the encoder 270 is used, the displacement of the assistant device 200 can be obtained by integrating moving positions and moving directions. If no integration error exists, the current position of the assistant device 200 and the displacement of the assistant device 200 from a reference position can be obtained using only the encoder 270. Like in an odometer, when measurement is performed for a short time, an accurate result may be obtained, but an error may be accumulated at each error sampling.

However, errors accumulated during calculation by the encoder 270 can be compensated for using a reference signal transmitted from the reference signal transmitting unit 140, for example, which will be described in detail with reference to FIG. 12 later.

The traveling unit 280 may be controlled by the control unit 250 to move the assistant device 200 by shift displacement calculated by the position calculator 290. The structure of the traveling unit 280 will be described in detail with reference to FIG. 7 later.

The position calculator 290 can calculate a distance between the first transmitter 141 within the reference signal transmitting unit 140 and the first receiver 241 within the reference signal receiving unit 240, i.e., a distance L between the main device 100 and the assistant device 200 using a time difference between reception of the time synchronizing signal and reception of the ultrasonic wave. In addition, the position calculator 290 can calculate an incident angle $\theta$ of the ultrasonic wave onto the assistant device 200 using a time difference between receptions of the ultrasonic wave by at least two ultrasonic sensors included in the first receiver 241. The position calculator 290 may also measure an orientation, i.e., an azimuth $\gamma$ of the assistant device 200 using a means for measuring an azimuth. The measuring of an azimuth may be accomplished through a gyro-scope, a magnetic compass, or the like, for example. The position calculator 290 can calculate the accurate current position of the assistant device 200 and the orientation of the assistant device 200 using the distance L, the incident angle $\theta$, and the azimuth y, which will be described in detail with reference to FIGS. 8 through 11 later.

Moreover, the position calculator 290 may compensate for a measurement error in the encoder 270 by comparing the current position calculated thereby and the current position measured by the encoder 270, for example.

The control unit 250 may control the operations of the other elements included in the assistant device 200. The control unit 250 may transmit an air quality index value received from the air sensing unit 260 and position information corresponding to the air quality index value to the main device 100 through the data transceiver 230. Upon receiving the assistant operation command from the main device 100 through the data transceiver 230, the control unit 250 may control the position calculator 290 to calculate shift displacement and control the traveling unit 280 to move by the shift displacement so that the assistant device 200 reaches a work position. When the control unit 250 controls the traveling unit 280 to move to the work position, the relationship between displacement and each of a wheel rotation and a traveling angle that are used by the encoder 270 to measure the displacement may be used. When it is assumed that the assistant device 200 moves from a current position to a work position through the shortest straight path, if a current orientation of the assistant device 200 does not coincide with a direction to the work position, the orientation of the assistant device 200 may be changed to cause the two directions to coincide before moving the assistant device 200, for example.

When the assistant device 200 reaches the work position, the control unit 250 may control the air quality improving unit 210 and the forced flow unit 220 or only the forced flow unit 220, thereby performing an assistant operation on a priority region.

Figure 6:
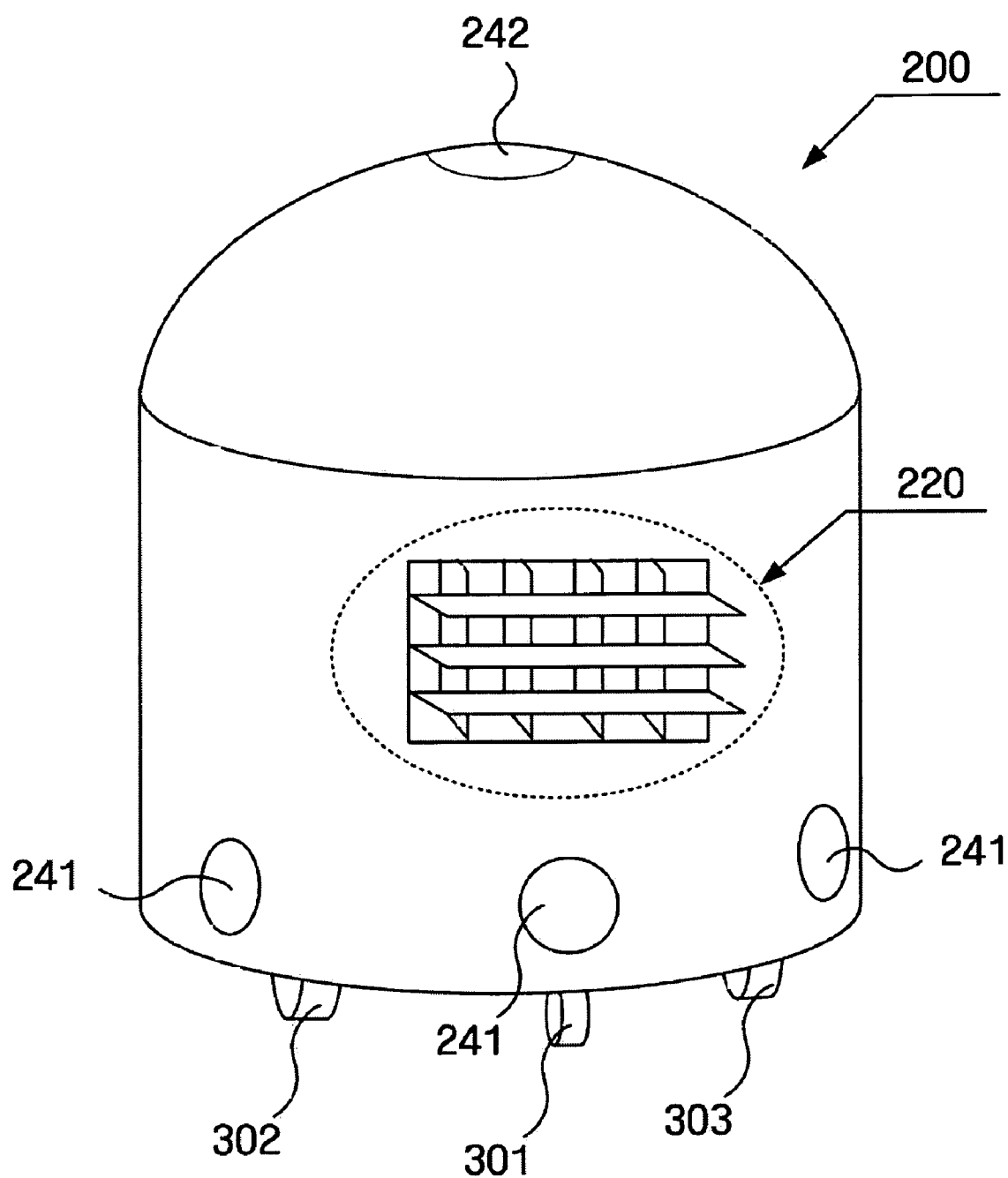
FIG. 6 is a schematic representation of an assistant device, such as that shown in FIG. 4, according to an embodiment of the present invention.

FIG. 6 is a schematic representation of the appearance of the assistant device 200 shown in FIG. 4. The assistant device 200 may include a plurality of first receivers 241, which are equiangularly disposed, and at least one second receiver 242. The forced flow unit 220 may include a fan generating an air blast and a tilt bar controlling the direction of the air blast. The traveling unit 280 may include a predetermined number of wheels 301, 302, and 303.

Figure 7:
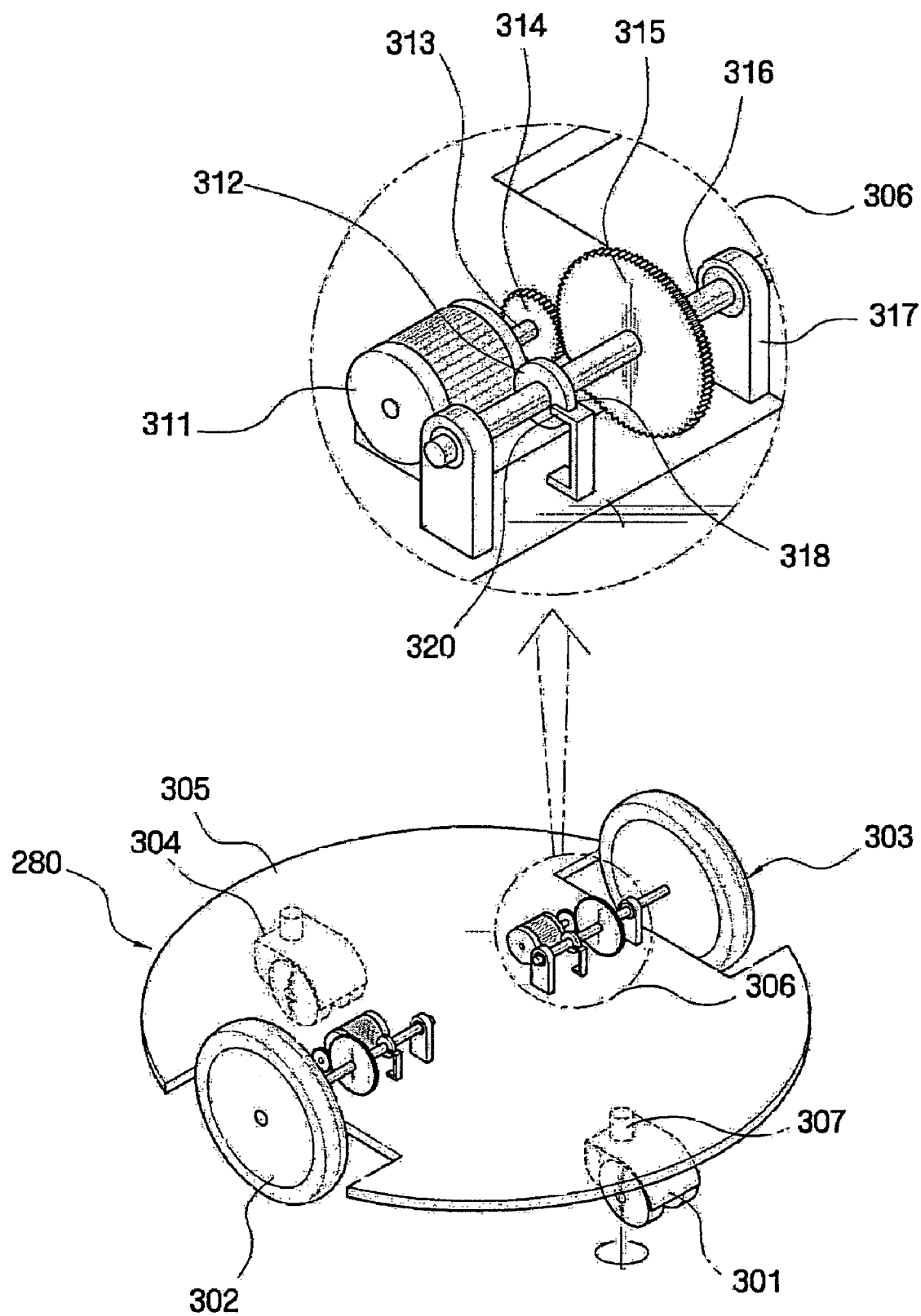
FIG. 7 is a schematic representation of a traveling unit moving an assistant device, according to an embodiment of the present invention.

FIG. 7 is a schematic representation of a traveling unit 280 moving the assistant device 200. The traveling unit 280 may include traveling wheels 302 and 303, a steering wheel 301, a lower support plate 305, and a power transmitter 306, for example.

The traveling wheels 302 and 303 can be coupled to opposite sides, respectively, of the lower support plate 305 so as to be rotatable and each fixed by an axle shaft 316 which is stationed by a plurality of fixing brackets 317 so as to be rotatable. The steering wheel 301 can be installed on the bottom of the lower support plate 305.

For structural stability, a driven wheel 304 may be further provided at the opposite side to the steering wheel 301. The steering wheel 301 can be made to rotate around the steering column by a predetermined steering angle according to a command of the control unit 250.

The power transmitter 306 may transmit power generated by an energy source to the traveling wheels 302 and 303. The circled part of FIG. 7 shows a detailed structure of the power transmitter 306.

A link gear 315 can be installed around the axle shaft 316. A driving gear 314 can be installed around a driving shaft 313 of a motor 311 so as to engage with the link gear 315. When the motor 311 is driven, the driving gear 314 rotates, turning the link gear 315. As a result, the axle shaft 316 and the traveling wheel 303 can rotate. A circular slit plate 312 with a plurality of slits arranged in a circumferential direction can be installed around the axle shaft 316. A light emitting sensor 318 and a light receiving sensor 320 may also be installed at opposites sides, respectively, of the circular slit plate 312 so that the light emitting sensor 318 emits light through a slit and the light receiving sensor 320 receives the light and generates an electrical signal, which is input to the encoder 270 (FIG. 4). Then, the encoder 270 can perform an operation on the electrical signal to measure displacement of the assistant device 200.

FIGS. 8 through 11 illustrate a method by which the assistant device 200 detects its position and orientation using a reference signal transmitted from the main device 100.

Figure 8:
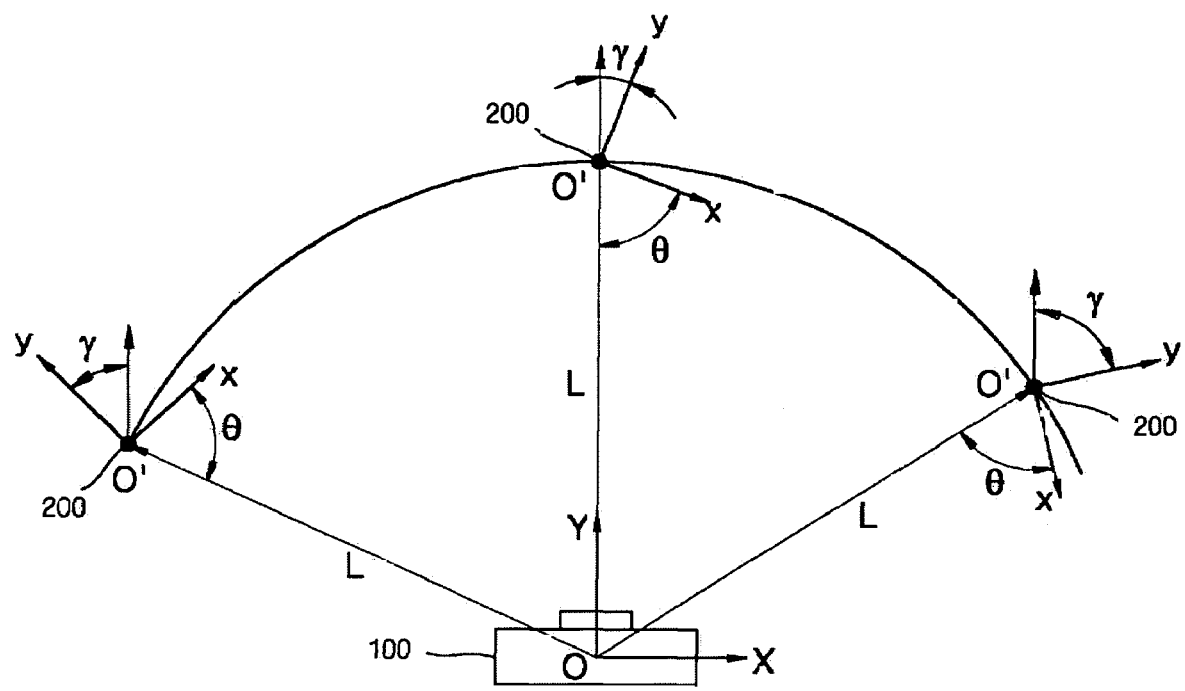
FIG. 8 is a schematic representation of factors that an assistant device should measure to detect the position and orientation thereof, according to an embodiment of the present invention.

Referring to FIG. 8, a positional relationship between the main device 100 and the assistant device 200 can be completely expressed as (L, θ, y) where L is a distance between a reference position of the main device 100 and the assistant device 200, θ is an incident angle of an ultrasonic wave with respect to an x-axis, i.e., a reference axis of the assistant device 200, and γ is an orientation of the assistant device 200.

Figure 9:
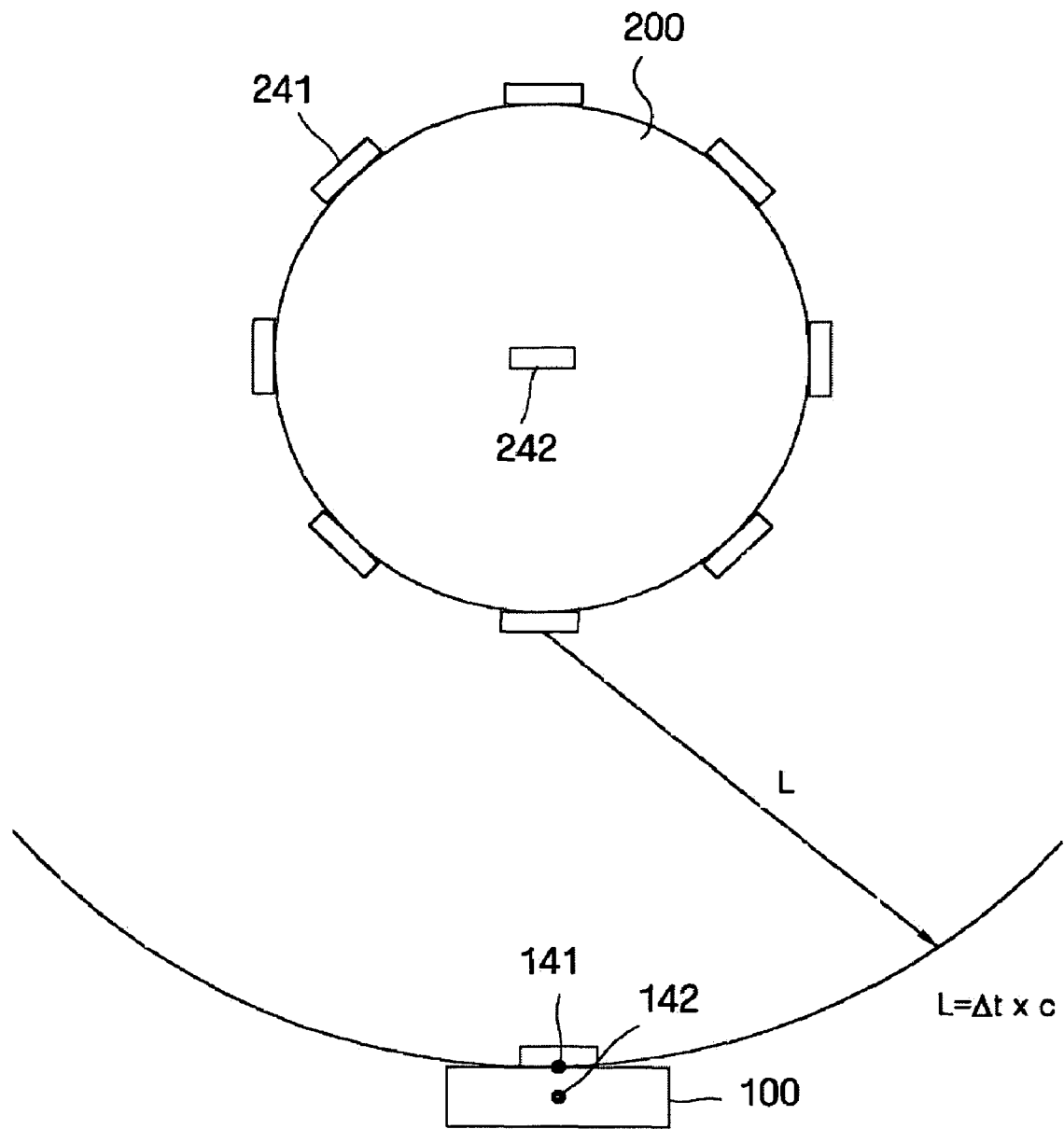
FIG. 9 is a schematic representation of a method of measuring a distance between a main device and an assistant device, according to an embodiment of the present invention.

FIG. 9 is a schematic representation of a method of measuring a distance between the main device 100 and the assistant device 200. The position calculator 290 can calculate the distance L using a received ultrasonic wave and time synchronizing signal, e.g., as shown in Equation (1):

$$L = \Delta t \cdot c_s, \tag{1}$$

where $c_s$ is the velocity of sound, i.e., 340 m/sec and $\Delta t$ is a time difference between when the ultrasonic wave is transmitted by a docking station and when the ultrasonic wave is received by the assistant device 200.

In the main device 100, the first transmitter 141 may transmit the ultrasonic wave and simultaneously the second transmitter 142 may transmit the time synchronizing signal, e.g., an RF signal or an IR signal. Then, the assistant device 200 may measure the time difference Δt between when the second receiver 242 receives the time synchronizing signal and when the first receiver 241 receives the ultrasonic wave. Thus, the distance L can be calculated by multiplying the time difference Δt by the velocity of sound $c_s$ (=340 m/sec).

Figure 10:
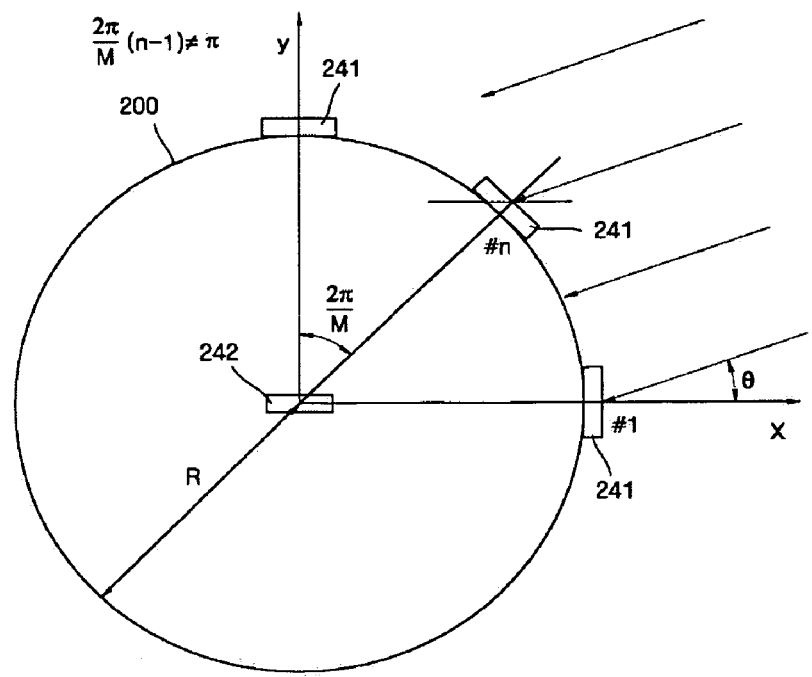
FIG. 10 is a schematic representation of a method of measuring an incident angle using an equation according to an embodiment of the present invention.
Figure 11:
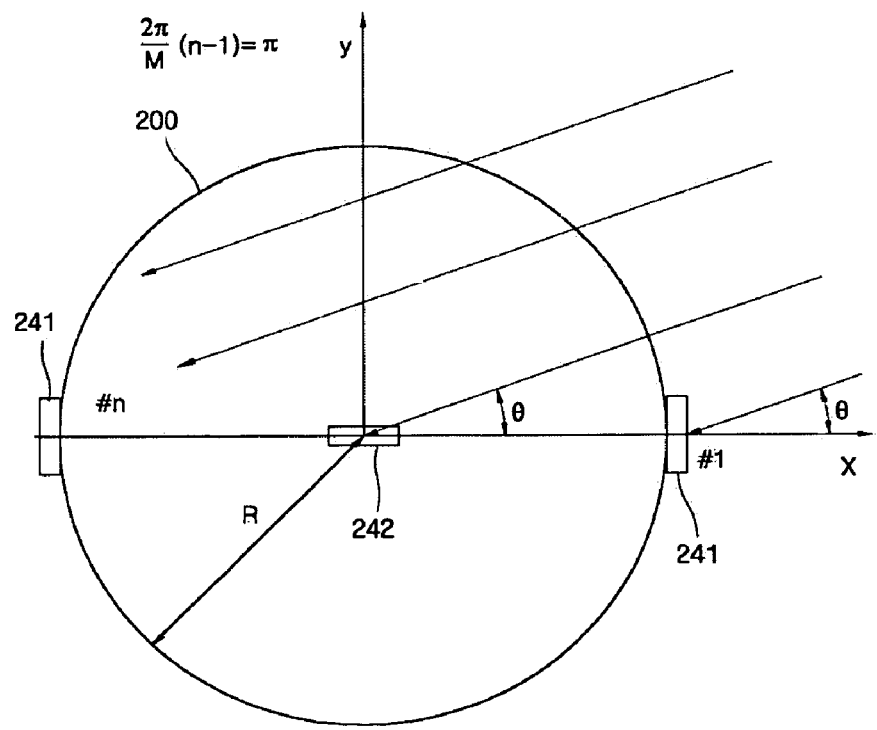
FIG. 11 is a schematic representation of a method of measuring an incident angle using another equation, according to an embodiment of the present invention.

FIGS. 10 and 11 are schematic representations of methods by which the position calculator 290 can calculate the incident angle θ using the ultrasonic wave received by the first receiver 241 included in the assistant device 200.

The position calculator 290 can calculate the incident angle θ of the ultrasonic wave onto the assistant device 200 using a time difference between receptions of the ultrasonic wave by at least two first receivers 241, e.g., ultrasonic sensors as shown in Equation (2) or (3) below. There, FIG. 10 corresponds to Equation (2) and FIG. 11 corresponds to Equation (3).

$$\text{If } \frac{2\pi}{M}(n-1) \neq \pi, \tag{2}$$

$$t_2 - t_1 = \frac{R\left(\cos\theta - \cos\left(\theta - \frac{2\pi}{M}(n-1)\right)\right)}{c},$$

where $t_1$ is time when a first ultrasonic sensor receives the ultrasonic wave, $t_2$ is time when a second ultrasonic sensor receives the ultrasonic wave, R is a radius of a circle, along which the ultrasonic sensors are disposed, from the central coordinates of the assistant device 200, M is the number of ultrasonic sensors, "c" is the velocity of sound, i.e., 340 m/sec, and "n" is a sequence in which the second ultrasonic sensor receives the ultrasonic wave when a reference sensor for measuring the incident angle θ with respect to the central coordinates of the assistant device 200 is defined as the first sensor.

However, if $$\frac{2\pi}{M}(n-1) = \pi,$$

e.g., if two first receivers 241, i.e., two ultrasonic sensors are present, the incident angle θ can be calculated using Equation (3).

$$\theta = \cos^{-1}\left(\frac{(t_2 - t_1) \cdot c}{2R}\right) \tag{3}$$

The assistant device 200 can determine the position and direction of the main device 100 based on (L, θ) obtained using Equations (1) through (3). However, the main device 100 may not be able to determine the current position of the assistant device 200 only with (L, θ). Referring to FIG. 8, many positions of the assistant device 200 may be determined by (L, θ). Here, the exact current position of the assistant device 200 may be determined by the azimuth y and simultaneously the orientation of the assistant device 200 may also be determined.

A gyro-scope, a magnetic compass, or the like may be used as a way to measure the azimuth γ.

As described above, the assistant device 200 may detect its position and orientation and a moving distance to a destination by receiving the reference signal from the main device 100. However, since the assistant device 200 may not always be present at a position where it can receive the reference signal transmitted from the main device 100, the relationship between displacement and each of wheel rotation and a traveling angle which are measured by the encoder 270 included in the assistant device 200 may be used, for example.

To use the relationship, a relationship between displacement and each of the wheel rotation and a steering angle must be accurately set. To accurately set the relationship, an error may be compensated for using the reference signal received from the main device 100.

Figure 12:
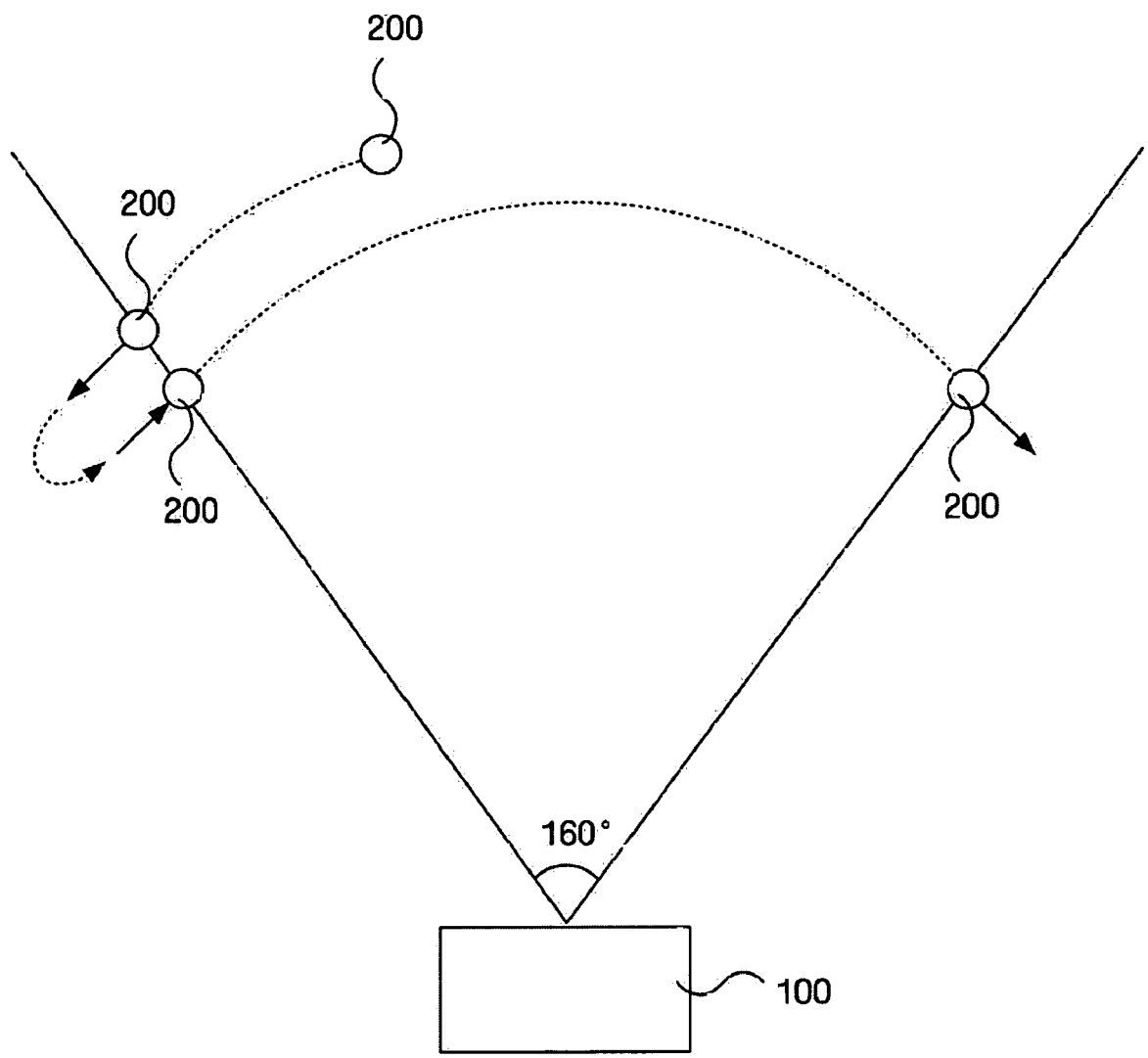
FIG. 12 is a schematic representation of a method of compensating for a relationship between displacement and each of wheel rotation and steering angle using a reference signal, according to an embodiment of the present invention.

FIG. 12 is a schematic representation of a method of compensating for an error in the relationship between displacement and each of wheel rotation and a steering angle.

Referring to FIG. 12, the assistant device 200 may move beyond a transmission range of 160° in which the main device 100 transmits IR rays. The assistant device 200 can easily go beyond the transmission range of 160° by moving at an angle greater than an angle of the normal of a first IR signal and in a direction closing to the main device 100 to increase accuracy. When the assistant device 200 does not receive the IR signal since it goes beyond the transmission range, it turns around in an arc shape to come back to the transmission range, maintaining a certain distance from the main device 100. Thereafter, the assistant device 200 may continuously track a portion where the IR signal reaches until it goes beyond the transmission range of 160° in an opposite direction. When the assistant device 200 goes beyond the transmission range, based on the results of the tracking, the assistant device 200 can compensate for an error in the relationship between displacement and each of wheel rotation and a traveling angle taking into account a difference between an angle (e.g., 158°) measured by the encoder 270 and 160°.

Such compensation may be performed using zero-point calibration before the assistant device 200 is driven or may be performed at any time when the assistant device 200 goes beyond the transmission range of 160° during operation, for example.

Figure 13:
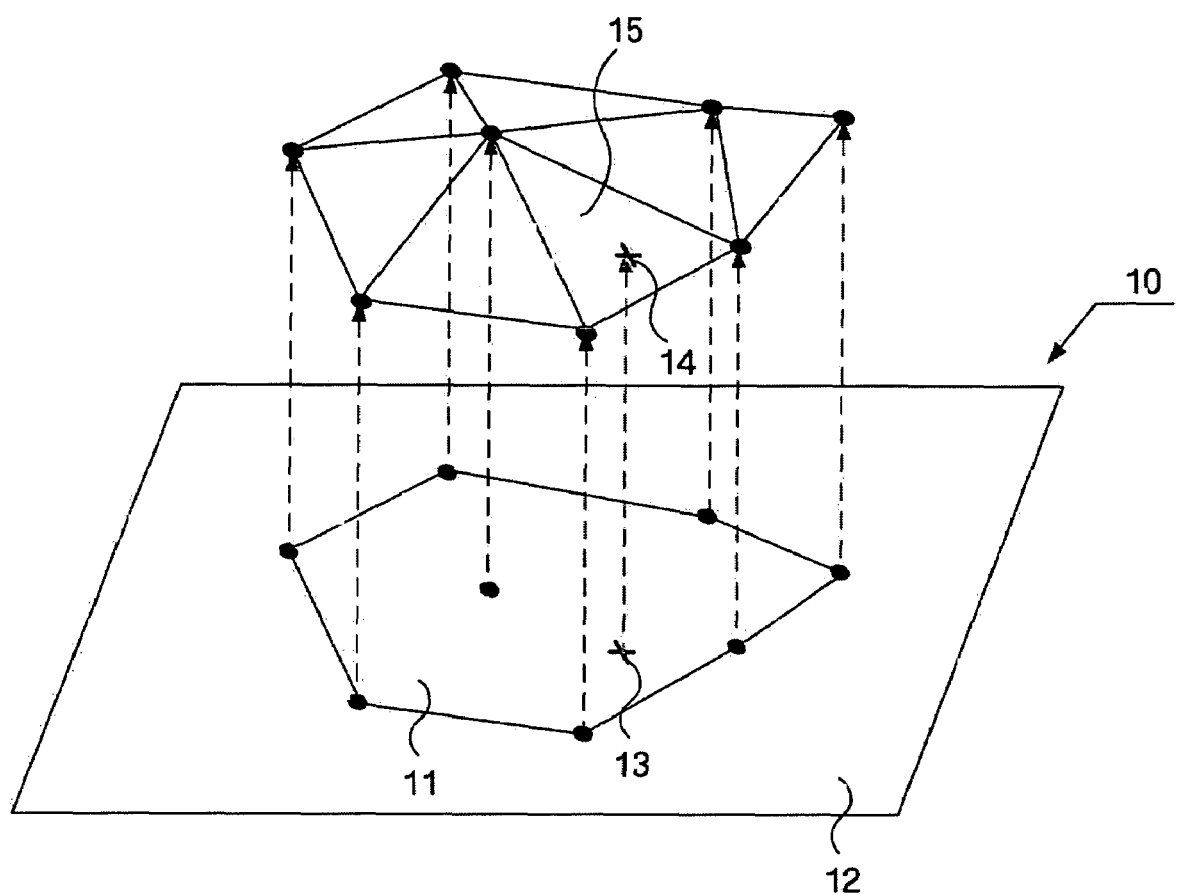
FIG. 13 is a schematic representation of a method of creating an air quality map of an entire management area using measurement values of an air quality index, according to an embodiment of the present invention.

FIG. 13 is a schematic representation of a method of creating an air quality map of an entire management area using air quality index values measured at different measurement points, according to an embodiment of the present invention.

The air quality map may express distribution of values of at least one air quality index, such as temperature, humidity, odor, dust, or VOC, within the management area together with position information. Positions of obstacles such as walls, doors, and windows within the management area and a position of the main device 100 may also be marked on the air quality map.

Referring to FIG. 13, an air quality index value measured at a measurement point (expressed in two-dimensional coordinates) within the management area 10 may be expressed as a height at the measurement point. When a plurality of values are measured at a single measurement point over time, a single representative value estimated from the plurality of values may be expressed at the measurement point. A mean or median value may be the representative value, for example.

After air quality index values are determined at all measurement points, the air quality index values of adjacent measurement points may be connected in a triangle so that an air quality index value at a point other than the measurement points can be estimated. For example, an air quality index value at a point 13 is a height of a point 14 on a triangle 15 that meets a line vertically extending from the point 13.

An air quality index value at a point in a region 11 within a closed line defined by the measurement points can be obtained using such an air quality map. However, the air quality map may not be able to be used in a region 12 beyond the region 11. For region 12, for example, an air quality map may be created with the assumption that an air quality index value decreases in inverse proportion to a distance from the measurement points located at the boundary of the region 11. An air quality map may be created for each air quality index. To create an air quality map, the assistant device 200 may move to different points within the management area 10, measure an air quality index value at each point using the air sensing unit 260, and detect a position of an obstacle within the management area 10. To detect the position of an obstacle, the assistant device 200 may include an obstacle sensor using ultrasonic waves, IR rays, or the like, for example.

In detail, the assistant device 200 may estimate the height of an obstacle by comparing output values of IR sensors disposed thereon in a vertical direction and may recognize as a transparent object such as glass an obstacle that is captured at a lower probability by an IR sensor than by an ultrasonic sensor. The recognition of the height and material of an obstacle is helpful to distinguish an object that must not be approached from an object that needs to be approached. In addition, an object whose existence changes over time among transparent objects may be recognized as a window. It may be important to identify a passage such as a door connecting an isolated space to the outside. Such passage may be initially recognized as an obstacle but may be recognized as a place where no obstacles are present over time. Near the passage, the rapid change of an air quality index value is sensed.

Meanwhile, the assistant device 200 transmits air quality map elements (e.g., a measurement position and air quality information) together with obstacle position information to the main device 100 through the data transceiver 230.

Figure 14:
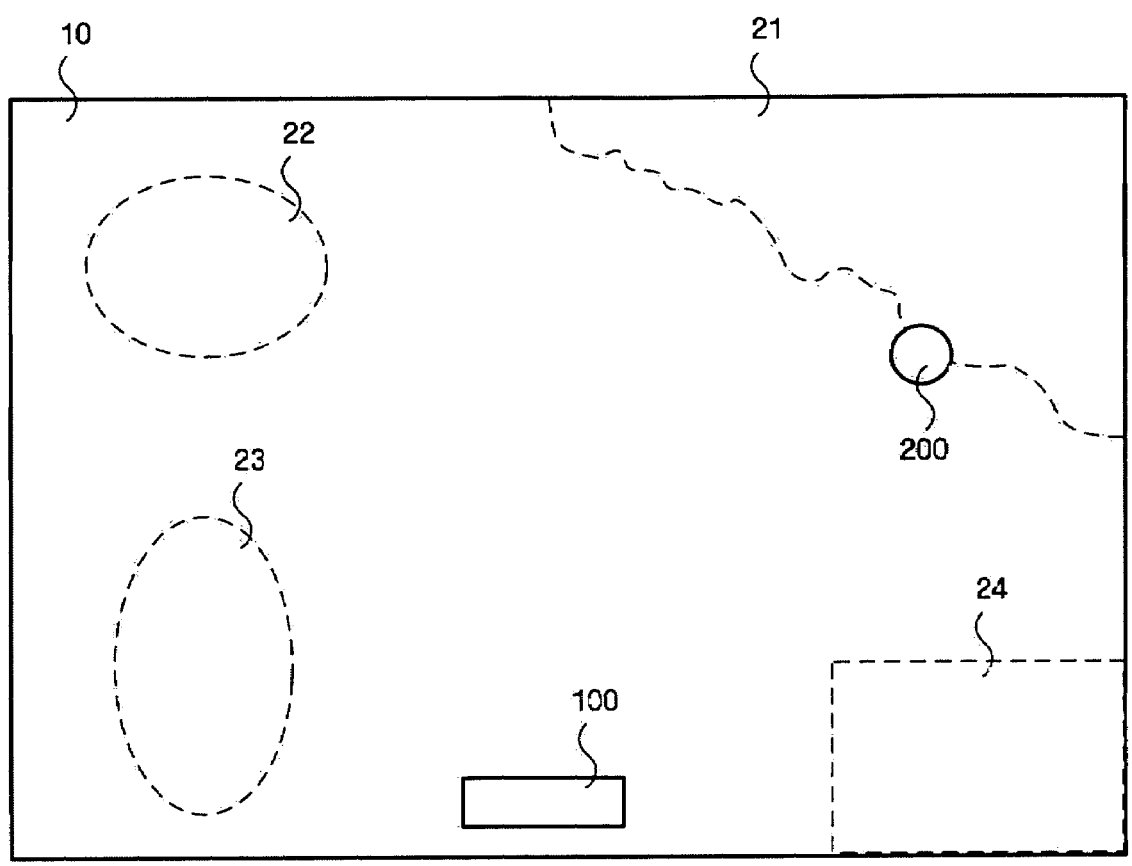
FIG. 14 is a schematic representation of abnormal regions on an air quality map.

FIG. 14 illustrates abnormal regions on an air quality map. The map management unit 160 creates an air quality map using air quality map elements and obstacle position information, which have been received from the assistant device 200, selects regions (hereinafter, referred to as abnormal regions) 21, 22, 23, and 24 in which an air quality index value may be beyond a predetermined threshold range on the air quality map, and allocates a priority order to each of the abnormal regions 21 through 24. For example, when a value of even one air quality index that is managed by cooperation between the main device 100 and the assistant device 200 is beyond the predetermined threshold range in a particular region, the particular region may be selected as an abnormal region. The predetermined threshold range can be defined as an upper limit and a lower limit, for example. When an air quality index value is greater than the upper limit or less than the lower limit, it may be determined as being beyond the predetermined threshold range. An air quality index may also have only one of the upper limit and the lower limit.

The priority order of the abnormal regions 21 through 24 may be determined by giving a priority order to air quality indexes according to importance. For example, when temperature is beyond a predetermined threshold range in a first abnormal region and cleanness is beyond a predetermined threshold range in a second abnormal region, if the temperature is given a higher priority than the cleanness, the first abnormal region may become a priority region. When the temperature and the cleanness have the same priority order, an abnormal region in which an air quality index, i.e., temperature or cleanness, has a greater offset from the predetermined threshold range may become the priority region.

In an alternative method of determining the priority order of the abnormal regions 21 through 24, the abnormal regions 21 through 24 selected on the air quality map may be shown to a user through the user interface unit 170 and the user may be allowed to directly determine the priority order. As another alternative, the assistant device 200 may be provided with a human detection sensor and an abnormal region in which a human being is present among the abnormal regions 21 through 24 may be given a higher priority order than other abnormal regions, for example.

After the priority region is determined using the map management unit 160, the main device 100 may perform a main operation (e.g., an air quality improving operation and a main flow operation) and transmit an assistant operation command to the assistant device 200 through the data transceiver 130. The assistant operation command may include a position of the priority region, a work position to which the assistant device 200 may desire to move to perform an assistant operation on the priority region, and a type and target value of an air quality index to be improved in the priority region, for example. A position that is near the priority region and allows the assistant operation to be easily performed on the priority region should be selected as the work position. For example, a point closest to the current position of the assistant device 200 among points on the border of the priority region may be selected as the work position. However, if the priority region is a closed space like a room having a passage, a position near the passage may be selected as the work position.

In response to the assistant operation command, the assistant device 200 moves to the work position and generates an assistant flow to transport the improved air delivered by the main flow to the priority region. The assistant device 200 may generate the assistant flow after sensing that the improved air has reached the assistant device using a sensor installed thereto.

Since the generation of the assistant flow, when the air sensing unit 260 included in the assistant device 200 senses that the particular type of air quality index designated by the assistant operation command has reached the target value designated by the assistant operation command, the assistant device 200 may report this fact to the main device 100. Thereafter, an operation of improving another type of air quality index that may be included in the assistant operation command may be performed by cooperation between the main device 100 and the assistant device 200.

When temperatures are decreased using an air cooler, humidity usually also decreases, and therefore, the humidity may be adjusted during an air cooling operation. However, when the humidity goes lower than a target value due to rapid decrease of the temperature, the humidity may be increased using a humidity controller installed in the assistant device 200, for example.

The cooperative improving operation may be continued until all target values for respective all types of air quality indexes included in the assistant operation command are reached.

Meanwhile, in removing dust, since dust tends to settle, if the output direction of the assistant flow is set to downward to blow the dust upward, the dust may be more quickly removed using an air cleaner installed in the assistant device 200.

When the cooperative improving operation on the priority region ends after the value of each air quality index reaches a corresponding target value, or when a user inputs a stop command, the assistant device 200 may stop the assistant operation, enter the priority region, and verify whether air quality has been satisfactorily improved in the priority region using the air sensing unit 260, for example.

According to embodiments of the present invention, the indoor air quality of an entire house can be improved through cooperation between a main device and an assistant device. In other words, even in an indoor space having a complicated structure in which it is difficult to improve indoor air quality to a satisfactory level with only the main device, the air quality can be efficiently improved in terms of time and space.

In addition, since an air state of every place within a predetermined area may be reported to the main device and air conditioning may be performed using only one assistant device, the present invention saves space and reduces costs compared with the conventional technology using a plurality of assistant devices or sensors.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An air conditioning system including at least one stationary air conditioner and at least one mobile assistant device which moves within a predetermined management area and performs an operation of improving air quality on a predetermined abnormal region within the management area by cooperating with the air conditioner, wherein the air conditioner comprises:
   an air quality improving unit improving a value of a predetermined air quality index into an appropriate range;
   a first forced flow unit generating a main flow to transport improved air toward the abnormal region; and
   a control unit controlling the air quality improving unit and the first forced flow unit to perform a main operation on the abnormal region and transmitting a command instructing the assistant device to perform an assistant operation on the abnormal region, and wherein the assistant device comprises:
   a traveling unit moving the assistant device to the abnormal region in response to the command; and
   a second forced flow unit generating an assistant flow to transport the improved air transported by the main flow into the abnormal region.

2. The air conditioning system of claim 1, wherein the air quality improving unit comprises at least one of an air cooler, an air heater, an ion generator, a dust remover, a humidifier, a dehumidifier, and a filter.

3. The air conditioning system of claim 1, wherein the first and second forced flow units comprise a fan forcibly blowing the improved air and a plurality of tilt bars adjusting a direction of air flow.

4. The air conditioning system of claim 1, wherein the air conditioner further comprises a reference signal transmitting unit transmitting a predetermined signal referred to by the assistant device to detect a position thereof and compensate for the position, and the assistant device further comprises a position calculator determining coordinates of a position on the basis of the air conditioner based on the predetermined signal.

5. The air conditioning system of claim 4, wherein the reference signal transmitting unit transmits a first signal and a second signal in synchronization with each other, and
the position calculator receives the first and second signals, calculates a distance between the air conditioner and the assistant device using a propagation speed between the first signal and the second signal, and calculates an incident angle of the second signal using a time difference between receptions of the second signal by a plurality of second signal receivers that are equiangularly disposed on the assistant device.

6. The air conditioning system of claim 1, wherein the air conditioner further comprises a map management unit updating an air quality map of the management area using an air quality map element received from the assistant device, determining abnormal regions based on the updated air quality map, and allocates a priority order to each of the determined abnormal regions, and
the air quality map element comprises coordinate information of a measurement point and air quality information of the measurement point.

7. The air conditioning system of claim 6, wherein the air quality map is created by expressing a value of the air quality index measured at each of a plurality of measurement points within the management area as a height at each measurement point.

8. The air conditioning system of claim 7, wherein the air quality map is created by connecting the index values corresponding to adjacent measurement points in a triangle.

9. The air conditioning system of claim 7, wherein each abnormal region is determined based on whether the measured value is beyond a predetermined threshold range, and the priority order is determined based primarily on an importance of the air quality index and secondarily on an offset of the measured value from the predetermined threshold range.

10. A method of improving air quality of a predetermined abnormal region in a management area through cooperation between at least one stationary air conditioner and at least one mobile assistant device, the method comprising:
transmitting an assistant operation command to the assistant device using the air conditioner;
moving the assistant device to the abnormal region in response to the assistant operation command;
improving a value of a predetermined air quality index into an appropriate range and generating a main flow using the air conditioner to transport improved air toward the abnormal region; and
generating an assistant flow using the assistant device to transport the improved air, which has been transported by the main flow, into the abnormal region.

11. The method of claim 10, further comprising calculating shift displacement between a current position of the assistant device and the abnormal region to move the assistant device to the abnormal region,
wherein the current position is calculated using a reference signal transmitted from the air conditioner, and the shift displacement is calculated using a relationship between displacement and each of wheel rotation and a traveling angle which are provided from an encoder.

12. The method of claim 11, further comprising compensating for an error in the relationship between the displacement and each of the wheel rotation and the traveling angle provided from the encoder by continuously tracking, using the assistant device, a portion where an infrared signal transmitted from the air conditioner reaches, while the assistant device moves around the air conditioner maintaining a predetermined distance from the air conditioner, until the assistant device goes beyond a transmission range of the infrared signal.

13. The method claim 11, wherein after the assistant device receives a first signal and a second signal in synchronization with each other transmitted from the air conditioner, the current position is calculated based on a distance between the air conditioner and the assistant device using a propagation speed between of the first signal and the second signal and an incident angle of the second signal using a time difference between receptions of the second signal by a plurality of second signal receivers that are equiangularly disposed on the assistant device.

14. The method of claim 10, further comprising:
updating an air quality map of the management area using an air quality map element received from the assistant device;
determining abnormal regions based on the updated air quality map; and
allocating a priority order to each of the determined abnormal regions.

15. The method of claim 14, wherein the air quality map is created by expressing a value of the air quality index measured at each of a plurality of measurement points within the management area as a height at each measurement point.

16. The method of claim 15, wherein the air quality map is created by connecting index values corresponding to adjacent measurement points in triangle.

17. The method of claim 15, wherein each abnormal region is determined based on whether the measured value is beyond a predetermined threshold range, and the priority order is determined based primarily on importance of the air quality index and secondarily on an offset of the measured value from the predetermined threshold range.

* * * * *